United States Patent
Pritchard et al.

(10) Patent No.: US 11,252,160 B1
(45) Date of Patent: Feb. 15, 2022

(54) ARTIFICIAL INTELLIGENCE SOFTWARE ACCESS BUNDLING

(71) Applicant: Bank of America Corporation, Charlotte, NC (US)

(72) Inventors: David Pritchard, London (GB); Tinku Thomas, London (GB); Rajesh M. Gopinathapai, Aurora, IL (US); Jennifer Lynn Greenwald, Chicago, IL (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 17/077,085

(22) Filed: Oct. 22, 2020

(51) Int. Cl.
 *H04L 29/08* (2006.01)
 *H04L 29/06* (2006.01)
 *H04L 41/16* (2022.01)
 *H04L 67/00* (2022.01)

(52) U.S. Cl.
 CPC ............ *H04L 63/104* (2013.01); *H04L 41/16* (2013.01); *H04L 67/34* (2013.01)

(58) Field of Classification Search
 CPC ................................................... H04L 63/104
 See application file for complete search history.

(56) References Cited

U.S. PATENT DOCUMENTS

| | | | |
|---|---|---|---|
| 8,225,416 | B2 | 7/2012 | Richards et al. |
| 8,490,152 | B2 | 7/2013 | Staiman et al. |
| 8,763,069 | B2 | 6/2014 | Renfro et al. |
| 9,189,644 | B2 | 11/2015 | Kling et al. |
| 9,483,488 | B2 | 11/2016 | Kling et al. |
| 9,495,380 | B2 | 11/2016 | Kling et al. |
| 9,558,334 | B2 | 1/2017 | Kling et al. |
| 9,584,525 | B2 | 2/2017 | Baikalov et al. |
| 9,727,729 | B2 | 8/2017 | Gupta |
| 10,509,906 | B2 | 12/2019 | Gupta |
| 10,749,910 | B1 * | 8/2020 | Balber ................... G06N 20/00 |

(Continued)

OTHER PUBLICATIONS

"Jaccard Index," https://en.wikipedia-org/wiki/Jaccard_index. Wikimedia Foundation, Inc., Sep. 6, 2020.

(Continued)

*Primary Examiner* — Adnan M Mirza
(74) *Attorney, Agent, or Firm* — Weiss & Arons LLP

(57) ABSTRACT

Artificial intelligence ("AI") systems and methods are provided for bundling software permissions across an enterprise organization. An AI engine may be deployed to maximize wellness of a software bundle. Maximizing the wellness may include adding a software permission to the bundle. Maximizing the wellness may include associating additional members with the bundle. Maximizing the wellness may include removing a software permission from the bundle. Maximizing the wellness may include disassociating a member from the bundle. The AI engine may streamline allocation of software permissions in an enterprise organization that would otherwise be unmanageable by human role engineers. For example, the AI engine may be deployed in enterprise organizations that utilize over 4,000 different software application across over 750,000 members. Utilizing the AI engine to streamline software permissions may limit exposure of the organization to an increased risk of a cyberattack on its information systems.

20 Claims, 6 Drawing Sheets

(56) References Cited

U.S. PATENT DOCUMENTS

2015/0074007 A1* 3/2015 Gabriel .................. G06F 16/93
   705/311
2019/0253427 A1    8/2019 Kling et al.

OTHER PUBLICATIONS

"Understand Jaccard Index, Jaccard Similarity in Minutes," https://medium.com/data-science-bootcamp/understand-jaccard-index-jaccard-similarity-in-minutes-2Sa703fbf9d7, Data Science Bootcamp, Aug. 20, 2020.

* cited by examiner

ARTIFICIAL INTELLIGENCE SOFTWARE ACCESS BUNDLING

FIELD OF TECHNOLOGY

Aspects of this disclosure relate to using artificial intelligence ("AI") to control access to software in a large enterprise organization.

BACKGROUND

Large enterprise organizations may provide their personnel with access to various software tools. Illustrative software may include database access, word processing, email applications and video conferencing. Large enterprise organizations may employ over 750,000 members. Such large enterprise organizations may utilize over 4,000 different software applications. The large number of members and software applications provide an even larger number of permutations for assigning access of the available software applications to the entity's members.

Software applications provide functionality that allow members to efficiently perform task needed by the organization. Therefore, it is important that members are assigned software applications that they need to perform their daily tasks. However, it is also important that members are not provided access to software applications that are not needed to perform their daily tasks.

Assigning extraneous permissions to use software applications may expose the organization to an increased risk of a cyberattack on its information systems. Members who have unnecessary access to software applications may not be aware that an unused application is malfunctioning or behaving erratically. Unused software applications may not be configured appropriately or may not be updated or patched regularly.

Conventionally, human role engineers may be employed by the organization to manage software application access. However, given the large scale of such a project, it would be desirable to apply artificial intelligence to manage and control software access across the enterprise organization. As described herein, ARTIFICIAL INTELLIGENCE SOFTWARE ACCESS BUNDLING provides technical solutions for reducing software application access permutations in enterprise organizations and improving the security of information technology infrastructure.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
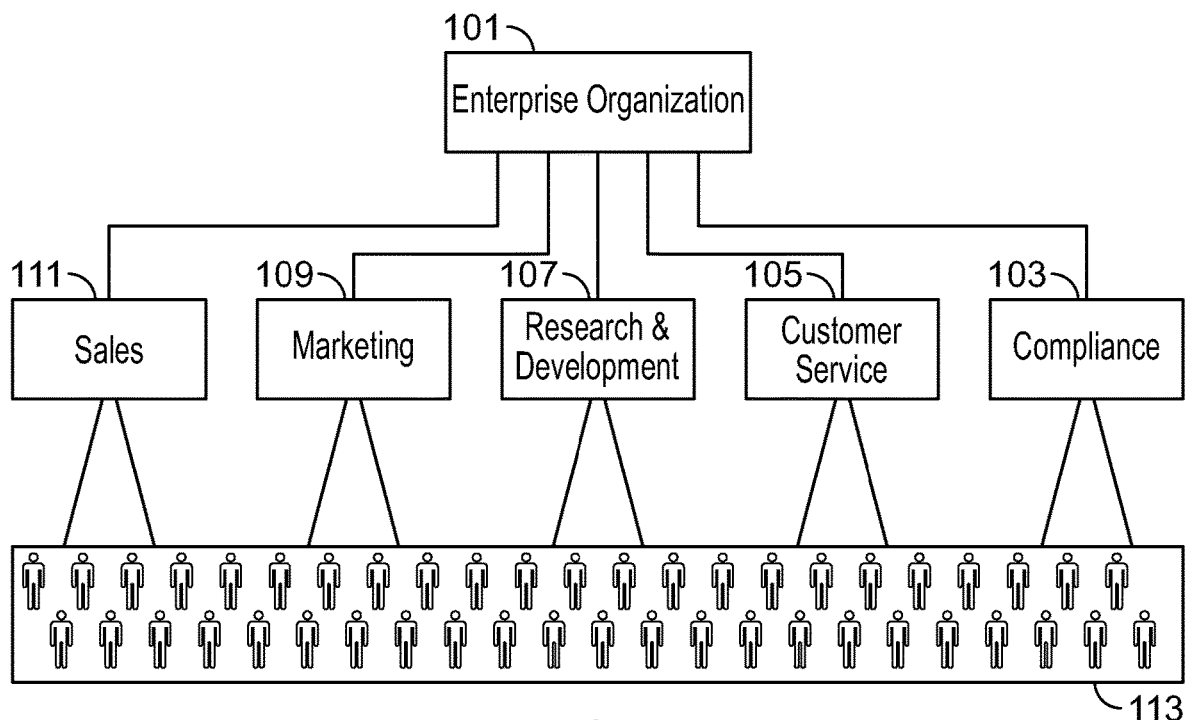
FIG. 1 shows an illustrative enterprise organization in accordance with principles of the disclosure.

Artificial intelligence ("AI") methods for controlling access to software permissions across an enterprise infrastructure is provided. The methods may include locating a bundle of software permissions. The software permissions may allow personnel or members of the enterprise to access one or more software applications. The methods may include identifying enterprise members that are associated with the bundle. An association with a bundle corresponds to allowing the member access to the software applications included in the bundle.

For each enterprise member, methods may include determining a number of entitlements associated with a particular enterprise member. Entitlements may be recorded in an entitlement database. An entitlement may refer to a software application permission used by the enterprise member. In some embodiments, a bundle of software permissions may allow a member to access one or more software applications. However, the enterprise member may be required to submit a request use of a desired software application included in the bundle. An entitlement may refer to a software application that has been requested by the enterprise member and is in use by the enterprise member.

Methods may include calculating a wellness of the bundle. The wellness may reflect how closely aligned the permissions included in bundle are with actual software application usage by a target enterprise member (e.g., entitlements). Methods may include mapping entitlements associated with the enterprise member onto the software permissions included in the bundle. The mapping may identify software application permissions that are included in the bundle and remain unused by the enterprise member. The mapping may indicate that the bundle includes too many software applications.

Methods may include maximizing the wellness of the bundle. Maximizing the wellness may include one or more of the following: (a) adding one or more new software permissions to the bundle; (b) associating a new enterprise member with the bundle; (c) removing one or more of the software permissions from the bundle; or (d) disassociating one or more of the enterprise members from the bundle. A software permission may be necessary, although not sufficient, for a member to access a target software application.

Each of steps (a)-(d) may provide logical operations that may be implemented by an AI engine. The AI engine may execute one or more of steps (a)-(d) alone or in combination. Based on steps (a)-(d), the AI engine may make changes to software permissions included in a bundle. Based on steps (a)-(d), the AI engine may change whether one or more enterprise members are associated with a bundle. Based on steps (a)-(d), the AI engine may create new bundles for a sub-set of enterprise members.

Adding permissions to the bundle may include inventorying entitlements of all existing members associated with the bundle. For example, a software bundle may be assigned to two or more members. Methods may then include determining whether adding a software permission to the bundle will lead to a wellness that is greater (i.e. better) than the current wellness. If adding the permission will improve the wellness, then methods may include adding that permission to the bundle. Adding a permission to the bundle may improve the wellness when a threshold number of members that have been assigned the bundle register entitlements to use software applications included in the bundle.

Associating new members with the bundle may include determining potential members that may be associated with the bundle. All members in the enterprise's organizational hierarchy may be eligible for association with a bundle. Methods may include determining whether associating a member to the bundle will improve the wellness of the bundle. When adding the member(s) will improve the wellness, the member(s) may be associated with the bundle. Associating a new member with the bundle may improve the wellness when the new member will utilize entitlements provided by the bundle.

Removing one or more permissions from the bundle may include determining a support count associated with a target permission. The support count may correspond to the number of members who have access to a target permission included in the bundle. Methods may include determining a mean and standard deviation of the support counts for all permissions included in the bundle. If the support count of the target permission is lower than one standard deviation away from the mean, methods may include dropping the permission from the bundle. Such a target permission is not well utilized by the bundle membership. A target permission that is not well utilized by the bundle membership may be an outlier permission.

Methods may include identifying and eliminating outlier permissions. An outlier permission may be identified when only a few members who have access to a software permission utilize the entitlement corresponding to the software permission. A "few members" may be determined based on a relative comparison of members associated with other software permissions or entitlements. A software permission that is not common to a threshold number of members associated with a bundle may be defined as an outlier permission. Outlier permissions may not be suitable for inclusion in the bundle. There may be other bundles/members for whom the permission may be common, but not the current bundle or the subset of members associated with the current bundle.

Removing members from a bundle may include determining a similarity for each member associated with a bundle. The similarity may correspond to a number of software permissions the target member utilizes (e.g., entitlements) included in a bundle divided by the total number of software permissions included in the bundle. Methods may include determining a mean and standard deviation of a similarity for each member associated with the bundle. If the similarity of a target member is lower than one standard deviation away from the mean, methods may include disassociating the target member from the bundle. The target member may be an outlier member.

The similarity metric indicates whether software permissions included in the bundle are appropriately scoped for tasks regularly performed by the target member. The similarity metric may indicate whether the bundle is overinclusive and includes too many software permissions for the target member. The similarity metric may indicate the bundle is underinclusive and does not include enough software permissions for members associated with the bundle.

For example, when a proportionally large number of members associated with a bundle are each associated with a relatively a low similarity metric, this may indicate the bundle is over-inclusive. The low similarity metric indicates that the bundle includes software permissions that are not used by a proportionally large number of members associated with the bundle.

A high similarity metric may not necessarily be indicative of an under-inclusive bundle. For example, a high similarity metric may indicate that the bundle is very well scoped and that each member associated with the bundle is using many or all of the software permissions included in the bundle. However, a high similarity may be leveraged to detect under-inclusive bundles.

For example, a subset of members may be associated with a plurality of different bundles. When each of the members in the subset are associated with a high similarity for each of the plurality of bundles, this may indicate the plurality of bundles are under-inclusive. Methods may include combining two or more of the plurality of bundles. Even after combining two or more of the plurality of bundles, the similarity metric may remain high for the subset of members.

Methods may include recursively iterating through steps (a)-(d). Methods may include iterating through steps (a)-(d) until no changes are made to software permissions included in the bundle or members associated with the bundle. Methods may include iterating through steps (a)-(d) until no changes are possible to software permissions included in the bundle or members associated with the bundle.

Repeating steps (a)-(d) cause a change to attributes of the bundle that maximize a wellness of the bundle. Attributes of a bundle may include software permissions included in the bundle. Attributes may include members associated with the bundle. Attributes of a bundle may include entitlements utilized by members associated with the bundle. Repeating steps (a)-(d) until no changes are possible to software permissions included in the bundle or members associated with the bundle may ensure that the bundle is associated with a target wellness and/or similarity metric.

When a software permission is removed from a bundle (e.g., after performing step (d)), methods may include adding the removed software permission to a different bundle. Methods may include creating a new bundle for the removed permission. Methods may include determining whether a removed software permission will increase or decrease the wellness of the different bundle before adding the removed software permission to the different bundle. When adding the removed software permission to a different bundle will decrease the wellness of the different bundle, methods may include creating a new bundle to hold the removed software permission.

A software bundle may be one of a plurality of bundles. Calculating and maximizing wellness of each of the bundles in the plurality may increase a total number of software permissions included in each bundle. Calculating and maximizing wellness of each of the bundles in the plurality may reduce a total number of bundles in the plurality.

Maximizing the wellness may reduce, across the enterprise infrastructure, software permission configurations by a factor of 10. An illustrative enterprise infrastructure may utilize at least 4,000 software applications across its membership. The enterprise organization may include 750,000 members. In large enterprise organizations, bundling software permission such that the bundles are each associated with a target wellness may reduce a number of software permission configurations by an order of 10 million.

Reducing a total number of bundles in the plurality may improve software security of the enterprise infrastructure. Unused or underutilized bundles may assign unnecessary software permissions to members. The unnecessary software permissions may remain outdated and unsupervised—thereby exposing the enterprise infrastructure to an increased risk of a cyberattack.

An artificial intelligence ("AI") computer program product for bundling software permissions across an enterprise infrastructure is provided. The AI computer program product, when executed by a processor on a computer system may perform various tasks to improve the wellness of software permission bundles.

The AI computer program product may extract, from an entitlement database, a set of software permissions associated with an enterprise member. The AI computer program product may dynamically calibrate a bundle of software permissions assigned to the enterprise member by adding to the bundle at least one software permission extracted from the entitlement database.

The AI computer program product may calibrate the bundle by assigning a new enterprise member to the bundle. The AI computer program product may remove from the bundle at least one software permission extracted from the entitlement database.

The calibrating of the bundle by the AI computer program product may reduce deviation between the set of software permissions extracted from the entitlement database and the software permissions included in the bundle. The calibrating of the bundle by the AI computer program product may reduce a total number of software permissions available (and unused) to an enterprise member.

When executed by the processor on the computer system, the AI computer program product may reduce a total number of software permission configurations available to the enterprise infrastructure by at least 10,000,000. Reducing the total number of software permissions may reduce operational waste by identifying unused or underutilized software applications. Reducing the total number of software permissions may ensure that members only have access to needed software applications.

Reducing the total number of software permissions may reduce a number of possible infiltration points for malware to access to the enterprise infrastructure. Thus, reducing the total number of software permissions may harden the enterprise infrastructure against a cyberattack.

The set of software permissions may be a first set. The maximizing may include disassociating one of the enterprise members from the bundle. The disassociated enterprise member may be associated with a second set of software permissions extracted from the entitlement database. The second set of software permissions may include more software permissions than the first set. The first set of software permissions may be insufficient for the removed member. The removed member may be added to a different software bundle. A new bundle may be created for the disassociated member.

Dynamically calibrating the bundle may include mapping the set of software permissions extracted from the entitlement database to individual software permissions included in the bundle. The mapping may identify software permissions included in the bundle that are not used by members currently associated with the bundle. The mapping may utilize machine learning algorithms such as Jaccard Index, cosine similarity or other methods for evaluating the similarity or diversity among data sets.

Based on the mapping, the AI computer program product may determine the wellness of bundle. Based on the mapping, the AI computer program product may determine whether to add or remove permissions from a bundle. Based on the mapping, the AI computer program product may determine whether to move permissions included in a bundle into another bundle. Based on the mapping, the AI computer program product may determine whether to associate or disassociate members with a bundle.

A bundle may be one of a plurality of bundles. The AI computer program product may dynamically calibrate each bundle in the plurality. The dynamic calibration may increase a total number of bundles in the plurality and reduce an average number of software permissions included in each bundle. For example, the AI computer program product may create smaller (e.g., less software permissions) bundles and assign more of the smaller bundles to each member.

Dynamically calibrating each bundle in the plurality may reduce a total number of bundles in the plurality and increase an average number of software permissions included in each bundle. For example, the AI computer program product may create larger bundles and assign less bundles to each member.

An artificial intelligence ("AI") computer program product for bundling software permissions across an enterprise infrastructure is provided. The AI computer program product, when executed by a processor on a computer system may extract, from an entitlement database, a first set of software permissions currently used by an enterprise member. The AI computer program product may extract a second set of software permissions from a bundle of software permissions assigned to the enterprise member.

The AI computer program product may compare the first and second sets. The AI computer program product may use machine learning algorithms such as a Jaccard Index, cosine similarity or method to compare the first and second sets. The AI computer program product may determine when the first and second sets share a threshold level of similarity.

In response to detecting the threshold level of similarity, the AI computer program product may trigger a first AI computer process. The first AI computer process may determine whether other enterprise members can be associated with the bundle without falling below the threshold level of similarity. The AI computer program product may associate those other enterprise members with the bundle.

When the first and second sets share a threshold level of diversity, the AI computer program product may restructure the bundle. Restructuring the bundle may include associating or disassociating enterprise members with the bundle. Restructuring the bundle may include adding or removing software permissions from the bundle. In some embodiments, restructuring the bundle may include adding or removing entitlements associated with a member.

Apparatus and methods in accordance with this disclosure will now be described in connection with the figures, which form a part hereof. The figures show illustrative features of apparatus and method steps in accordance with the principles of this disclosure. It is to be understood that other embodiments may be utilized, and that structural, functional and procedural modifications may be made without departing from the scope and spirit of the present disclosure.

The steps of methods may be performed in an order other than the order shown and/or described herein. Method embodiments may omit steps shown and/or described in connection with illustrative methods. Method embodiments may include steps that are neither shown nor described in connection with illustrative methods. Illustrative method steps may be combined. For example, an illustrative method may include steps shown in connection with any other illustrative method.

Apparatus may omit features shown and/or described in connection with illustrative apparatus. Apparatus embodiments may include features that are neither shown nor described in connection with illustrative apparatus. Features of illustrative apparatus may be combined. For example, an illustrative apparatus embodiment may include features shown or described in connection with any other illustrative apparatus and/or method embodiment.

FIG. 1 shows illustrative enterprise organization 101. Organization 101 includes multiple sub-divisions. The sub-divisions include compliance department 103. The sub-divisions include customer service department 105. The sub-divisions include research and development ("R&D") department 107. The sub-divisions include marketing department 109. The sub-divisions include sales department 111.

Each of the sub-divisions may utilize members of organization personnel 113. Some members of personnel 113 may perform duties on behalf of two or more of the sub-divisions. Members of personnel 113 may be provided access to software tools and applications they need to efficiently perform their duties.

For example, members of compliance department 103 may desire access to software applications that centralize, consolidate and automate processes relevant to organization's 101 adherence to government regulations. Such software applications may provide functionality such as real-time alerts to changes in government regulations, generate compliance reports, schedule required audits, manage policies and analyze compliance across all sub-divisions of organization 101.

Members of customer service department 105 may desire software applications including customer relationship management tools that help members respond and report on customer concerns. Illustrative software applications that may be desired by members of R&D department 107 may include tools that allow members of personnel 113 to collaborate on investigations, share experimental results model and simulate theoretical findings.

Illustrative software applications desired by members of marketing department 109 may include tools that manage and create marketing campaigns, track/analyze results of marketing campaigns, distribute marketing material and automate other marketing tasks. Illustrative software applications desired by members of sales department 111 may include tools that centralize and organize promotional materials, workflow automation, sales forecasting, price quoting and data visualization.

Members of personnel 113 who serve in one sub-division, may not need access to software tools associated with another sub-division. Some members of personnel 113 may serve in two or more of sub-divisions 103-111. Those members may require software tools utilized by two or more of the sub-divisions. However, providing those members with access to all the software tools utilized by two or more sub-divisions may be overbroad.

AI systems and methods described herein may bundle the software tools desired by members of sub-divisions 103-111 so that the members are provided access to software tools that are closely aligned with the functions of those members. The AI systems and methods may dynamically adjust software bundles when a new member joins organization 101. The AI systems and methods may dynamically adjust software bundles when a member leaves organization 101. The AI systems and methods may dynamically adjust software bundles when a new software tools is made available to organization 101. The AI systems and methods may dynamically adjust software bundles when a software tools is decommissioned from use within organization 101.

Figure 2:
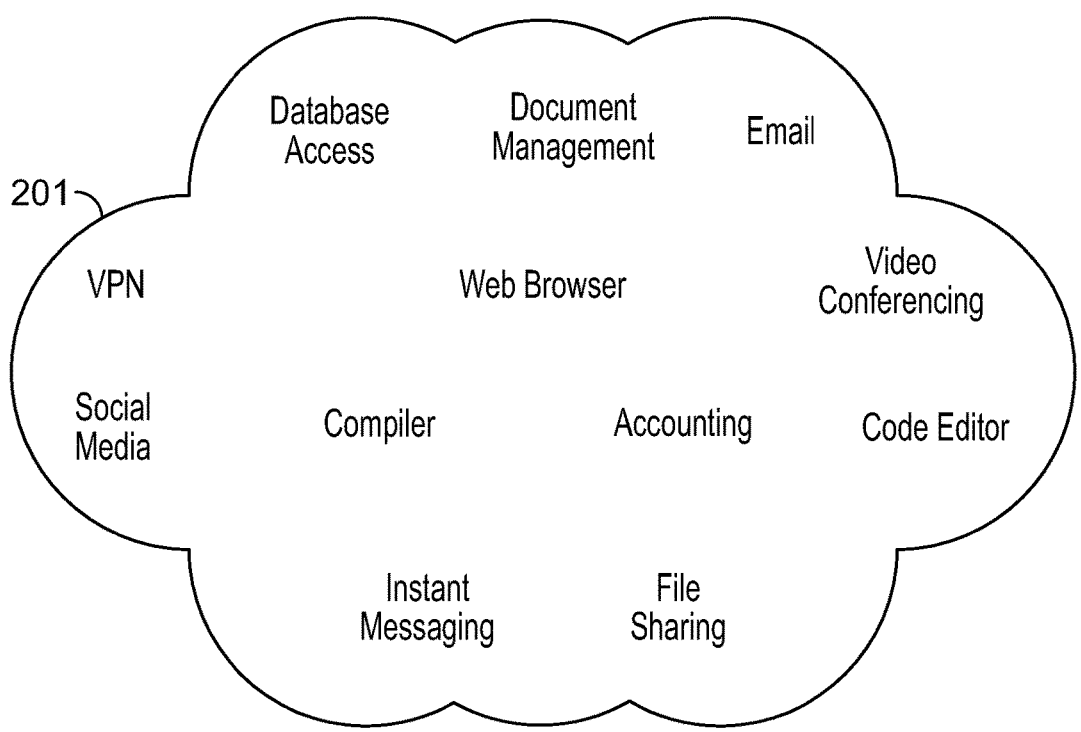
FIG. 2 shows illustrative software applications in accordance with principles of the disclosure.

FIG. 2 shows illustrative software bundle 201. Bundle 201 may be generated by AI systems and methods described herein. Bundle 201 includes software tools that are likely to be common to many or all members of personnel 113. Such common software tools may include email applications, video conferencing applications and database access. Bundle 201 also includes software tools that are likely to be used by members having specialized duties within organization 101. Such specialized tools include compiler applications, accounting applications and code editor applications.

Figure 3:
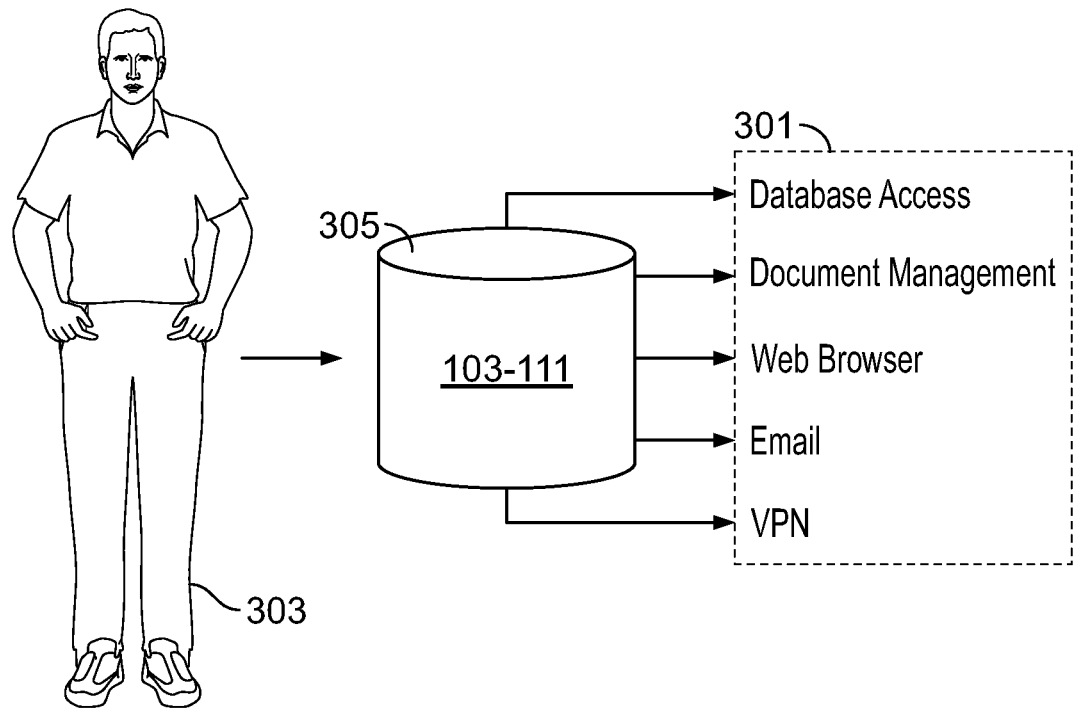
FIG. 3 shows an illustrative software bundle generated in accordance with principles of the disclosure.

FIG. 3 shows that generic software bundle 301 has been generated for member 303. AI engine 305 may generate generic bundle 301. AI engine 305 may generate generic bundle 301 based on various factors and attributes associated with organization 101. AI engine 305 may apply machine learning techniques to assess which software applications are commonly used by personnel 113 and entitlements utilized by members of personnel 113.

For example, AI engine 305 may create a generic bundle 301 based on achieving a target wellness. "Wellness" of a bundle may be determined by AI engine 305 by measuring a similarity of actual entitlements recorded for members of personnel 113 to permissions granted by a generic bundle. Wellness may be defined as:

$$\frac{\frac{\text{Number of entitlements covered by the bundle}}{\text{Number of permissions in the bundle}}}{\text{Number of members associated with the bundle}}$$

Illustrative wellness values may range from 0 (poor) to 1 (good). AI engine 305 may determine which software applications to include in generic bundle 301 such that the wellness associated with generic bundle 301 is 1 or within a threshold value of 1.

Generic bundle 301 may provide member 303 access to software tools that are common across sub-divisions 103-111. In some embodiments, all members of personnel 113 may be assigned generic bundle 301. Any time a new member is added to personnel 113, generic bundle 301 may be associated with the new member.

Figure 4:
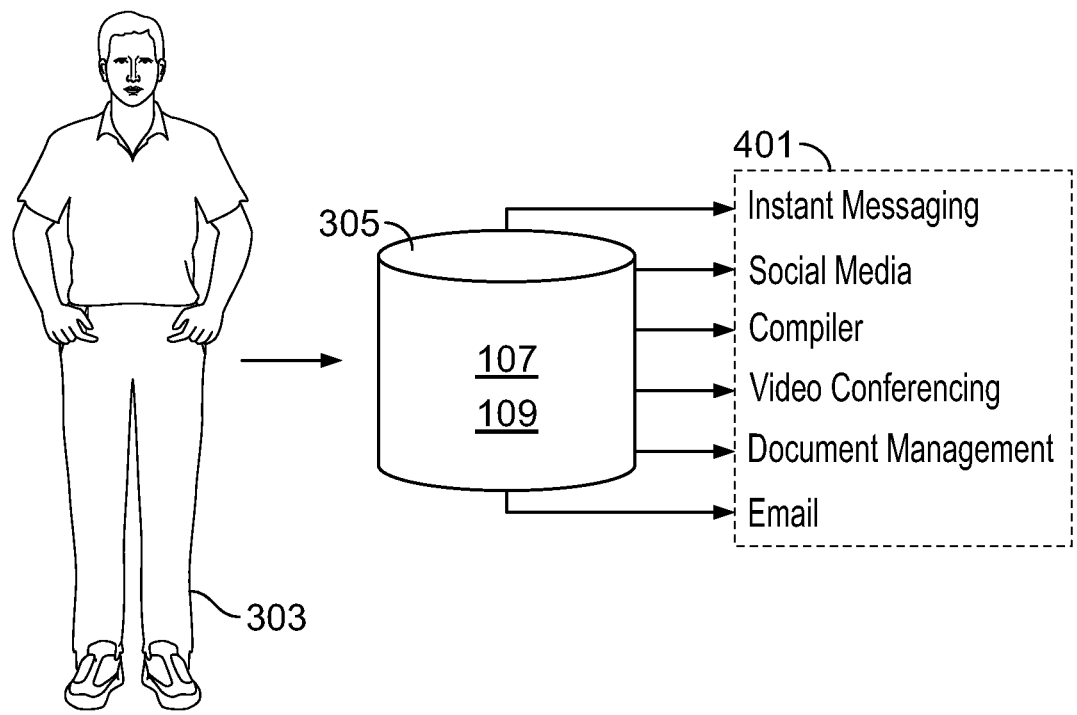
FIG. 4 shows an illustrative software bundle generated in accordance with principles of the disclosure.

FIG. 4 shows that AI engine 305 has created specialized software bundle 401 for member 303. Specialized bundle 401 may include software tools that are provided only for members of R&D sub-division 107 and marketing sub-division 109. Member 303 may be assigned generic bundle 301 and specialized bundle 401.

Figure 5:
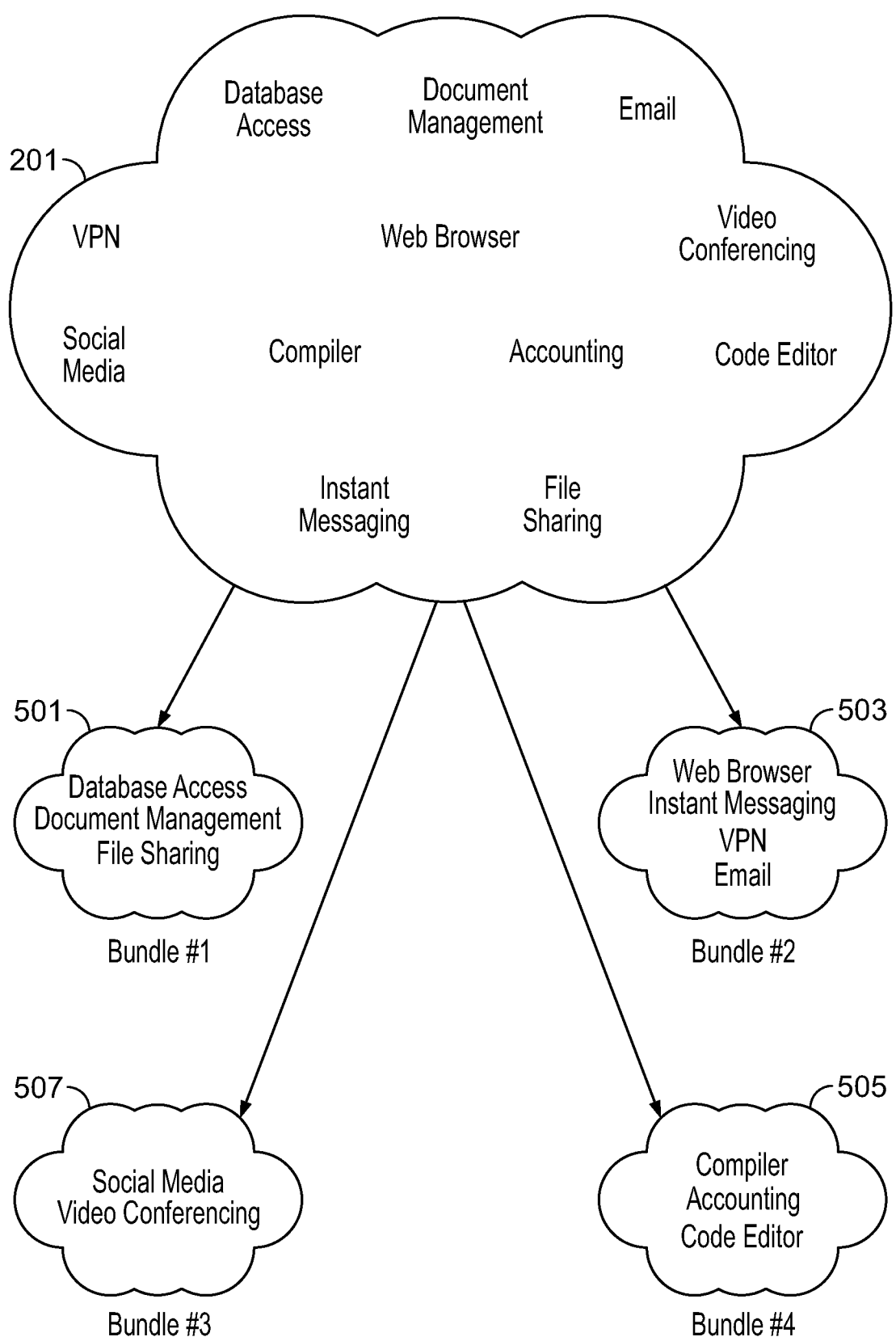
FIG. 5 shows an illustrative software bundles generated in accordance with principles of the disclosure.

FIG. 5 shows that AI engine 305 may split software tools included in bundle 201 into multiple specialized bundles 501-507. Each of specialized bundles 501-507 may be assigned to target members of personnel 113. Each of specialized bundles 501-507 may be customized by AI engine 305 for the job description of a target member of personnel 113. AI engine 305 may utilize human resource data to identify a job description of a target member. Human resource data may include job title, job location, assigned manager, and any other suitable factors.

AI engine 305 may utilize actual entitlements in use by other members of personnel 113 that share a similar set of human resource attributes. Similarities between sets of attributes may be determined using machine learning techniques such as the Jaccard similarity coefficient, Tanimoto similarity/distance and Cosine similarity.

Figure 6:
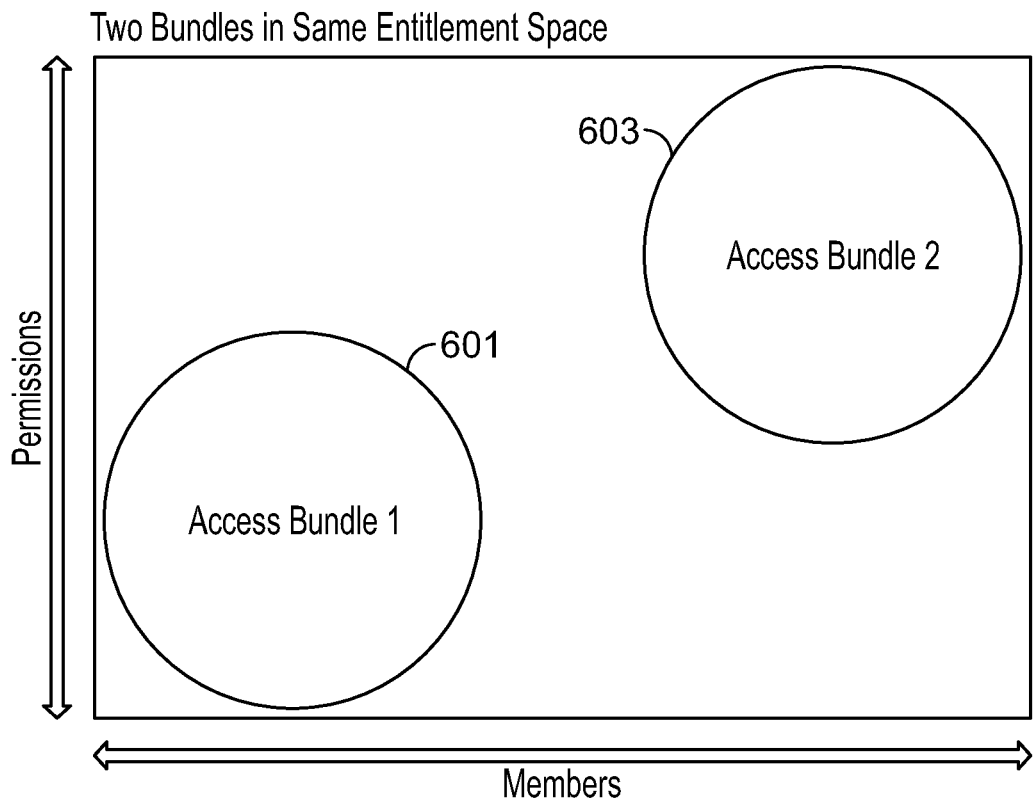
FIG. 6 shows an illustrative process for bundling software in accordance with principles of the disclosure.
Figure 7:
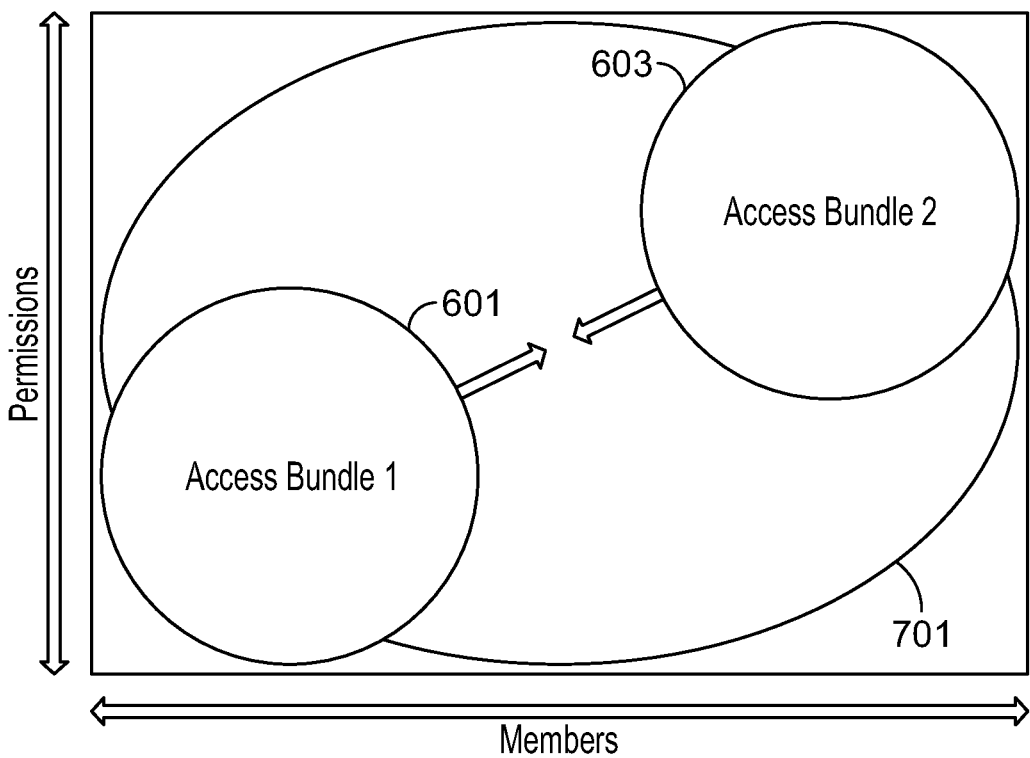
FIG. 7 shows an illustrative process for bundling software in accordance with principles of the disclosure.

AI engine 305 may dynamically update and shuffle bundles. For example, FIG. 6 shows illustrative bundles 601 and 603 that are assigned to members in a sub-division. Each of bundles 601 and 603 may include different or overlapping software permissions. FIG. 7 shows that AI engine 305 may combine bundles 601 and 603 into bundle 701. Bundle 701 may be associated with members who have been previously associated with bundles 601 and 603. In some embodiments, AI engine 305 may create a new grouping of members that will be associated with bundle 701.

Even after creating combined bundle 701, AI engine 305 may maintain bundles 601 and 603. The number of members assigned to bundles 601 or 603 may be reduced. Members previously assigned to bundles 601 or 603 may be disassociated with bundles 601/603 and associated with bundle 701. AI engine 305 may combine bundles and change which members are associated with a bundle based on maximizing a wellness for each bundle.

Figure 8:
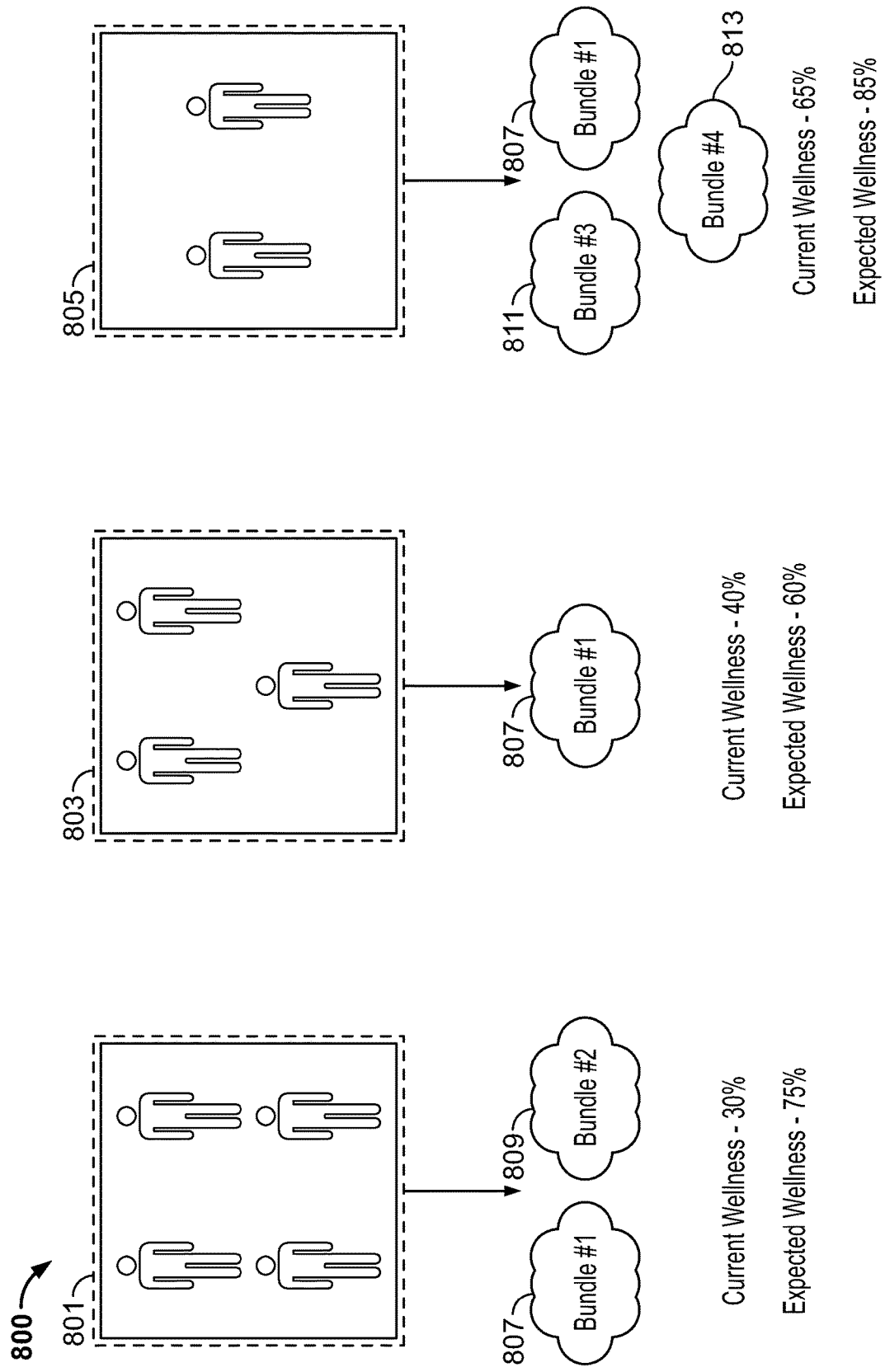
FIG. 8 shows an illustrative process for bundling software in accordance with principles of the disclosure.

FIG. 8 shows illustrative scenario 800. In scenario 800, AI engine 305 has created member group 801. AI engine 305 has associated members of group 801 with bundles 807 and 809. Scenario 800 shows that previously, members of group 801 had been assigned bundles having a wellness of 30%. Scenario 800 shows that by changing the members of group 801 that are associated with bundles 807 and 809, AI engine 305 expects the resulting wellness to be 75%.

In scenario 800, AI engine 305 has created member group 803. AI engine 305 has associated members of group 803 with only bundle 807. Scenario 800 shows that previously, members of group 803 had been assigned bundles having a wellness of 40%. Scenario 800 shows that by limiting members of group 803 to an association with only bundle 807, AI engine 305 expects the resulting wellness to be 60%. AI engine 305 may generate bundle 807 such that the software permissions included in bundle 807 will yield a wellness of 75% when associated with members of group 801 and a wellness of 60% when associated with members of group 803.

In scenario 800, AI engine 305 has created member group 805. AI engine 305 has associated members of group 805 with bundles 807, 811 and 813. Scenario 800 shows that previously, members of group 805 had been assigned bundles having a wellness of 65%. For example, group 805 may have previously included members of group 801.

Scenario 800 shows that by selecting members of group 805 to be associated with bundles 807, 811 and 813, AI engine 305 expects the resulting wellness to be 85%. AI engine 305 may generate bundle 807 such that the software permissions included in bundles 807 yield a wellness of 85% when associated with members of group 805, a wellness of 60% when associated with members of group 803 and a wellness of 75% when associated with members of group 801. AI engine 305 determine which software permissions to include in bundle 807 such that bundle 807 may be shared by a threshold number of members and maintain a threshold wellness.

Figure 9:
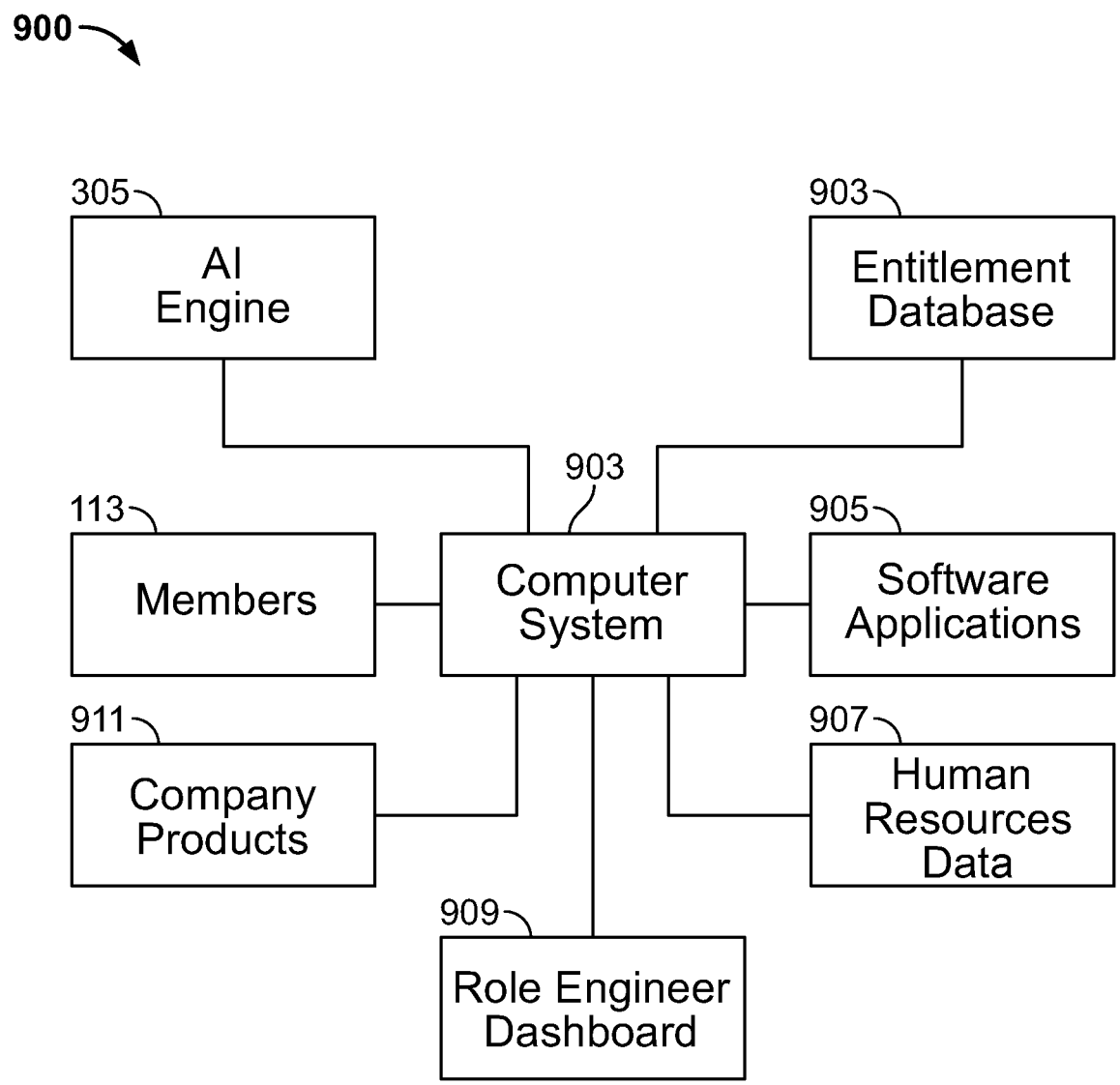
FIG. 9 shows an illustrative system for bundling software in accordance with principles of the disclosure.

FIG. 9 shows illustrative system 900 for bundling software in accordance with principles of this disclosure. System 900 includes AI engine 305. AI engine 305 may include computer code for executing machine learning algorithms. AI engine 305 may utilize different machine learning models to create bundles and associate members with those bundles.

AI engine 305 may utilize a first machine learning model for creating or changing a bundle of software permissions. AI engine 305 may utilize a second machine learning model for creating or changing associations between the bundle and members of an enterprise organization. Illustrative machine learning algorithms may include one or of the following machine learning algorithms: Naïve Bayes Classifier Algorithm, K Means Clustering Algorithm, Support Vector Machine Algorithm, Apriori Algorithm, Linear Regression, Logistic Regression, Artificial Neural Networks, Nearest Neighbors, Random Forests and/or Decision Trees. Any suitable machine learning algorithm may be utilized.

AI engine 305 may be run on computer system 901. Computer system 901 may be a network connected computer system. Computer system 901, as disclosed herein, may include a processor circuit. The processor circuit may control overall operation of computer system 901 and its associated components. The processor circuit may include hardware, such as one or more integrated circuits that form a chipset. The hardware may include digital or analog logic circuitry configured to perform any suitable (e.g., logical) operation.

Computer system 901 may include one or more of the following hardware components: I/O circuitry, which may include a transmitter device and a receiver device and may interface with fiber optic cable, coaxial cable, telephone lines, wireless devices, physical network layer hardware, a keypad/display control device or any other suitable encoded media or devices; peripheral devices, which may include counter timers, real-time timers, power-on reset generators or any other suitable peripheral devices; a logical processing device, which may compute data structural information, structural parameters of the data, or quantify indices; and machine-readable memory.

Machine-readable memory may be configured to store, in machine-readable data structures: machine learning algorithms, AI algorithms, or any other suitable information or data structures. Components of computer system 901 may be linked by a system bus, wirelessly or by other suitable interconnections. System components may be present on one or more circuit boards. In some embodiments, the components may be integrated into a single chip. The chip may be silicon-based.

Computer system 901 may include RAM, ROM, an input/output ("I/O") module and a non-transitory or non-volatile memory. The I/O module may include a microphone, button and/or touch screen which may accept user-provided input. The I/O module may include one or more of a speaker for providing audio output and a video display for providing textual, audiovisual and/or graphical output.

Software applications may be stored within the non-transitory memory and/or other storage medium. Software applications may provide instructions to the processor that enable computer system 901 to perform various functions. For example, the non-transitory memory may store software applications such as an operating system, application programs, and an associated database. Some or all of computer executable instructions of AI engine 305 may be embodied in hardware or firmware components of computer system 901.

Computer system 901 may include cloud computing and virtualization implementations of software. Such implementations may be designed to run on a physical server supplied externally by a hosting provider, a client, or other virtualized platform. Software application programs, which may be used by computer system 901, may include computer executable instructions for invoking user functionality related to communication, such as email, short message service ("SMS"), and voice input and speech recognition applications. Software application programs may utilize one or more algorithms, as disclosed herein, that maximize wellness of software bundles or any other suitable task.

Computer system 901 may include a communication circuit. The communication circuit may include a network interface card or adapter. When used in a WAN networking environment, computer system 901 may include a modem, antenna or other circuitry for establishing communications over a WAN, such as the Internet. The communication circuit may include a modem and/or antenna. The existence of any of various well-known protocols such as TCP/IP, Ethernet, FTP, HTTP and the like is presumed, and computer system 901 may be operated in a client-server configuration to permit retrieval of web pages from a web-based server. Web browsers can be used to display and manipulate data on web pages.

Computer system 901 may include various other components, such as a display, battery, speaker, and antennas. Network connected systems may be portable devices such as a laptop, tablet, smartphone, other "smart" devices (e.g., watches, eyeglasses, clothing having embedded electronic circuitry) or any other suitable device for receiving, storing, transmitting and/or displaying electronic information.

Computer system 901 may include, and may be operational with, numerous other general purpose or special purpose computing system environments or configurations. Examples of well-known computing systems, environments, and/or configurations that may be suitable for use with this disclosure include, but are not limited to, personal computers, server computers, handheld or laptop devices, tablets, "smart" devices, mobile phones, multiprocessor systems, minicomputer systems, microprocessor systems, mainframe computers, distributed computing environments that include any of the above systems or devices, and the like.

Computer system 901 may utilize computer-executable instructions, such as program modules, executed by a processor. Generally, program modules include routines, programs, objects, components, data structures, etc. that perform particular tasks or implement abstract data types. Computer system 901 may be operational with distributed computing environments where tasks are performed by remote processing devices that are linked through a communications network. In a distributed computing environment, program modules may be located in both local and remote computer storage media including memory storage devices. Computer system 901 may rely on a network of remote servers hosted on the Internet to store, manage, and process data (e.g., "cloud computing" and/or "fog computing").

Computer system 901 disclosed herein may be produced by different manufacturers. For example, a role engineer may connect to dashboard 909 via a first server, and AI engine 305 may be run on a second server, and entitlement database 903 may be run on a third server. Computer system 901 may capture data in different formats. Computer system 901 may use different data structures to store captured data. Computer system 901 may utilize different communication protocols to transmit captured data or communicate with other systems. Despite such operational differences, computer servers may be configured to operate substantially seamlessly to execute machine learning models and run an AI engine across different systems operating systems, hardware or networks.

Computer system 901 may submit requests for information received from AI engine 305 to entitlement database 903. Entitlement database 903 may store records of software applications that are currently being used by members of organization 101. Entitlement database 903 may store records of software permissions that are accessible to members of organization 101 and have been requested by the members. AI engine 305 may apply one or more machine learning algorithms to records stored in entitlement database to improve the wellness of software bundles.

AI engine 305 may utilize data associated with company products 911 to determine which software applications may be needed by members of organization 101. AI engine 305 may utilize human resource data 907 to determine which software applications may be needed by members of organization 101. Human resource data 907 may be used by AI engine 305 to determine which members of organization 101 may need software applications 905. AI engine 305 may correlate multiple data sources with human resource data 907 to determine which members of organization 101 may need software applications 905.

System 900 may include dashboard 909. Dashboard 909 may display software bundles and member associations for software bundles generated by AI engine 305. AI engine 305 may generate bundling recommendations that adhere to business constraints. For example, if entitlements are granted (on software permission included in a bundle) based on eligibility and toxicity rules, the bundling recommendations would also comply with these rules.

Exemplary eligibility rules may define a population of members allowed to access (e.g., associated with a software permission) a particular application. Certain combinations of software permissions granted to a members may create "toxic" access rights. A toxic combination of permissions may allow member to perform tasks or take actions that should never be controlled by a single member.

For example, an exemplary business rule may mandate that a member should not be able to create an invoice and approve that same invoice. AI engine 305 may ingest business rules to identify toxic combinations that may allow members to violate the business rules. AI engine 305 may prevent members from obtaining software permissions that are considered toxic combinations.

AI engine 305 may be configured to reduce a number of bundles for a given sub-division, thereby reducing governance overhead associated with that sub-division. AI engine 305 may be configured to follow new business firm constraints when generating bundling recommendations. Illustrative new business firm constraints applied by AI engine 305 may include:

Software permissions eligible for bundling will be considered for inclusion into one or more bundles;

Software permissions privileged in nature may be considered for bundling only if the bundle that includes the privileged permission is a privileged access bundle;

Software permissions scheduled for retiring may not be considered for bundling;

Software permissions not eligible for use by members of the sub-division may not be included in any bundling.

AI engine 305 may recommend permissions for inclusion in a bundle only if the bundle includes a threshold minimum number of permissions. AI engine 305 may recommend permissions for inclusion in a bundle only if the permissions can be bundled such that the resulting bundle will be associated with a minimum number of members and have a minimum wellness metric.

Thus, methods and apparatus for ARTIFICIAL INTELLIGENCE SOFTWARE ACCESS BUNDLING are provided. Persons skilled in the art will appreciate that the present disclosure can be practiced by other than the described embodiments, which are presented for purposes of illustration rather than of limitation, and that the present disclosure is limited only by the claims that follow.

What is claimed is:

1. An artificial intelligence ("AI") computer program product for bundling software permissions across an enterprise infrastructure, the computer program product, when executed by a processor on a computer system:
   extracts, from an entitlement database, a set of software permissions associated with an enterprise member; and
   dynamically calibrates a bundle of software permissions associated with the enterprise member by:
   (a) adding to the bundle at least one member of the set of software permissions extracted from the entitlement database;
   (b) associating a new enterprise member with the bundle; and
   (c) removing from the bundle at least one member of the set of software permissions extracted from the entitlement database;
   wherein the dynamic calibration reduces:
   a deviation between the set of software permissions extracted from the entitlement database and the bundle of software permissions; and
   a total number of software permissions available to the enterprise member.

2. The AI computer program product of claim 1, when executed by the processor on the computer system, reduces a total number of software permission configurations available to the enterprise infrastructure by at least 10,000,000.

3. The AI computer program product of claim 1, wherein the set of software permissions is a first set, the dynamic calibration further includes disassociating at least one enterprise member from the bundle and wherein the at least one disassociated enterprise member is associated with a second set of software permissions extracted from the entitlement database that includes more software permissions than the first set.

4. The AI computer program product of claim 1, wherein the dynamic calibration reduces a number of possible infiltration points for malware to access to the enterprise infrastructure thereby hardening the enterprise infrastructure against a cyberattack.

5. The AI computer program product of claim 1, when executed by the processor on the computer system, further dynamically calibrates the bundle by mapping the set of software permissions extracted from the entitlement database to the bundle of software permissions.

6. The AI computer program product of claim 5, wherein the mapping comprises applying machine learning methods for evaluating similarity or diversity among the set of software permissions extracted from the entitlement database and the bundle of software permissions.

7. The computer program product of claim 1, wherein the bundle is one of a plurality of bundles and applying the dynamically calibration to each bundle in the plurality:
   increases a total number of bundles in the plurality; and
   reduces an average number of software permissions included in each bundle.

8. The computer program product of claim 1, wherein the bundle is one of a plurality of bundles and applying the dynamically calibration to each bundle in the plurality:
   reduces a total number of bundles in the plurality; and
   increases an average number of software permissions included in each bundle.

9. An artificial intelligence ("AI") computer program product for bundling software permissions across an enterprise infrastructure, the computer program product, when executed by a processor on a computer system:
   extracts:
   from an entitlement database, a first set of software permissions associated with an enterprise member; and
   a second set of software permissions from a bundle of software permissions associated with the enterprise member;
   compares the first set and the second set of software permissions;
   when the first set and the second set of software permissions share a threshold level of similarity:
   applies a first AI computer process that determines whether other enterprise members can be associated with the bundle and maintain the threshold level of similarity; and
   associating the other enterprise members with the bundle; and
   when the first set and the second set of software permissions share a threshold level of diversity, restructures the bundle and enterprise members associated with the bundle.

10. The AI computer program product of claim 9, when executed by the processor on the computer system, restructures the bundle by removing software permissions from the bundle.

11. The AI computer program product of claim 9, when executed by the processor on the computer system, restructures the bundle by adding software permissions to the bundle.

12. An artificial intelligence ("AI") method for controlling access to software permissions across an enterprise infrastructure, the method comprising:
   locating a bundle of software permissions;
   identifying enterprise members associated with the bundle;
   for each enterprise member, determining entitlements associated with the enterprise member recorded in an entitlement database;
   calculating a wellness of the bundle by mapping the entitlements associated with the enterprise member onto the software permissions included in the bundle;
   maximizing the wellness of the bundle by:
   (a) adding a new software permission to the bundle;
   (b) adding a new enterprise member to the bundle;
   (c) disassociating one of the software permissions from the bundle; or
   (d) removing one of the enterprise members from the bundle.

13. The method of claim 12 further comprising, repeating steps (a)-(d) for maximizing the wellness each time one of steps (a)-(d) change an attribute of the bundle.

14. The method of claim 12 further comprising adding the software permission removed at step (c) to a different bundle.

15. The method of claim 14, further comprising determining whether the software permission removed at step (c) will increase or decrease the wellness of the different bundle before adding the removed software permission to the different bundle.

16. The method of claim 15 further comprising, when adding the software permission removed at step (c) to the different bundle will decrease the wellness of the different bundle, creating a new bundle to hold the software permission removed at step (c).

17. The method of claim 16 further comprising adding a new enterprise member to the new bundle, wherein adding the new enterprise member increases the wellness of the new bundle.

18. The method of claim 12 wherein the bundle is one of a plurality of bundles, and the maximizing of the wellness of each of the bundles in the plurality reduces a total number of bundles in the plurality, thereby:
  reducing, across the enterprise infrastructure, software permission configurations by a factor of 10 compared to prior to maximizing the wellness; and
  improving software security of the enterprise infrastructure.

19. The method of claim 18 wherein:
  the enterprise infrastructure comprises:
    at least 4,000 software applications; and
    at least 250,000 enterprise members; and
  the calculating and the maximizing of the wellness of the plurality of bundles reduces a number of software permission configurations by at least 10,000,000.

20. The method of claim 12 wherein the removing one of the software permissions from the bundle at step (c) comprises:
  determining a total number of enterprise members that have access to each software permission included in the bundle;
  calculating a mean number of enterprise members that have access to each software permission in the bundle;
  determining a standard deviation of each software permission included in the bundle from the mean number; and
  when a target software permission in the bundle is more than one standard deviation away from the mean number, removing the target software permission from the bundle.

* * * * *